(12) United States Patent
Yoo et al.

(10) Patent No.: US 7,606,135 B2
(45) Date of Patent: Oct. 20, 2009

(54) OPTICAL RECORDING/REPRODUCING APPARATUS CAPABLE OF RECORDING/REPRODUCING INFORMATION ONTO/FROM VARIOUS TYPES OF OPTICAL RECORDING MEDIA OF DIFFERENT RECORDING DENSITIES AND DIFFERENT THICKNESSES

(75) Inventors: Jang-hoon Yoo, Seoul (KR); Hag-hyun Jang, Seongnam-si (KR); Soo-han Park, Yongin-si (KR); Soo-jin Jeong, Suwon-si (KR); Tae-youn Heor, Suwon-si (KR); Bong-gi Kim, Suwon-si (KR)

(73) Assignees: Samsung Electronics Co., Ltd., Suwon-si (KR); Samsung Electro-Mechanics Co., Ltd., Suwon-si (KR)

( * ) Notice: Subject to any disclaimer, the term of this patent is extended or adjusted under 35 U.S.C. 154(b) by 576 days.

(21) Appl. No.: 11/430,847

(22) Filed: May 10, 2006

(65) Prior Publication Data

US 2006/0274631 A1    Dec. 7, 2006

(30) Foreign Application Priority Data

Jun. 7, 2005    (KR) .................. 10-2005-0048257

(51) Int. Cl.
*G11B 7/00*    (2006.01)
(52) U.S. Cl. .............. 369/112.1; 369/112.17; 369/112.15
(58) Field of Classification Search .............. 369/112.1, 369/112.17, 112.15
See application file for complete search history.

(56) References Cited

U.S. PATENT DOCUMENTS 6,272,098 B1    8/2001    Takahashi et al.
6,643,245 B2    11/2003    Yamamoto et al.

(Continued)

FOREIGN PATENT DOCUMENTS

CN    1347097    5/2002

(Continued)

OTHER PUBLICATIONS

Office Action issued on Feb. 12, 2007 by the Korean Intellectual Property Office for Korean Patent Application No. 2005-48257.

(Continued)

*Primary Examiner*—Wayne R Young
*Assistant Examiner*—LaTanya Bibbins
(74) *Attorney, Agent, or Firm*—Stein McEwen, LLP (57) ABSTRACT

An optical recording/reproducing apparatus including a plurality of light sources emitting lights with different wavelengths for use in recording/reproducing information onto/from various types of optical recording media of different recording densities, in which at least two lights emitted from the light sources have polarization components orthogonal to each other; an objective lens for focusing a light from each of the light sources to a corresponding optical recording medium; a collimating lens disposed between the light sources and the objective lens for collimating lights from the light sources; a hologram element installed between the collimating lens and the objective lens for refracting a light emitted from one of the light sources, in which the light to be refracted is selected by wavelength and polarization components; and a photodetector receiving a light that is reflected from the corresponding optical recording medium after being focused by the objective lens.

18 Claims, 3 Drawing Sheets

U.S. PATENT DOCUMENTS

| | | | |
|---|---|---|---|
| 7,088,513 B2 * | 8/2006 | Tanaka et al. | 359/569 |
| 7,443,778 B2 * | 10/2008 | Komma | 369/112.1 |
| 2003/0053397 A1 * | 3/2003 | Katayama et al. | 369/112.17 |
| 2003/0107979 A1 * | 6/2003 | Kim et al. | 369/112.07 |
| 2004/0105374 A1 * | 6/2004 | Ogasawara et al. | 369/112.02 |
| 2004/0190423 A1 * | 9/2004 | Yagi et al. | 369/94 |
| 2004/0213135 A1 | 10/2004 | Mori et al. | |
| 2005/0141393 A1 * | 6/2005 | Sakamoto | 369/112.23 |
| 2005/0226122 A1 | 10/2005 | Ooi et al. | |

FOREIGN PATENT DOCUMENTS

| | | |
|---|---|---|
| CN | 1405762 | 3/2003 |
| EP | 0 932 145 | 7/1999 |
| JP | 09-073655 | 3/1997 |
| JP | 2002-015448 | 1/2002 |
| JP | 2002-236253 | 8/2002 |
| JP | 2004-219977 | 8/2004 |
| JP | 2005-4964 | 1/2005 |
| KR | 2003-64062 | 7/2003 |
| KR | 2003-77920 | 10/2003 |
| KR | 2003-77923 | 10/2003 |
| WO | WO 2004/012188 | 2/2004 |

OTHER PUBLICATIONS

Search Report issued in Korean Patent Application No. 2005-48257 on Aug. 23, 2006.

Office Action Issued by State Intellectual Property Office of People's Republic of China for application No. 20061007411.9 on Sep. 7, 2007.

Extended European Search Report issued by the European Patent Office on Jan. 26, 2009.

* cited by examiner

OPTICAL RECORDING/REPRODUCING APPARATUS CAPABLE OF RECORDING/REPRODUCING INFORMATION ONTO/FROM VARIOUS TYPES OF OPTICAL RECORDING MEDIA OF DIFFERENT RECORDING DENSITIES AND DIFFERENT THICKNESSES

CROSS-REFERENCE TO RELATED APPLICATION

This application claims the benefit of Korean Patent Application No. 2005-48257, filed on Jun. 7, 2005 in the Korean Intellectual Property Office, the disclosure of which is incorporated herein by reference.

BACKGROUND OF THE INVENTION

1. Field of the Invention

An aspect of the present invention relates in general to an optical recording/reproducing apparatus, and more specifically, to an optical recording/reproducing apparatus capable of recording/reproducing information onto/from various types of optical recording media of different recording densities and different thicknesses.

2. Description of the Related Art

In an optical recording and/or reproducing apparatus for recording and/or reproducing information on and/or from an optical information storage medium, such as an optical disc, the recording density (or recording capacity) of the optical information storage medium is determined by the size of a light spot, using a light beam focused by an objective lens. Equation 1 below shows the relation between the size of a light spot S and a wavelength ($\lambda$) of light and a numerical aperture (NA) of the objective lens.

$$S \propto \lambda/NA \qquad \text{[Equation 1]}$$

In general, in order to increase the area recording density of the optical disc, the size of a light spot formed on an optical disc needs to be reduced. As is evident from Equation 1, to reduce the light spot size, the wavelength should be short and the NA should be large. For instance, light with a short wavelength such as a blue violet laser and an objective lens with an NA of 0.6 or higher are required.

As well known already, a digital versatile disc (DVD) records and/or reproduces information using light with a wavelength of 650 nm (or 635 nm) and an objective lens with an NA of 0.6 (or 0.65 for a recording type DVD). Considering that a typical DVD is 120 mm in diameter and has a track pitch of 0.74 µm, its recording density on each side will be greater than 4.7 GB.

Nevertheless, the DVD is not sufficient for recording high definition moving images. This is because at least 23 GB of recording density for a single side is needed to record 135-minute-long moving images in high definition.

To meet the demand for high-density recording capacity, much research and studies are underway to develop and set standards of a high density optical disc, namely a next-generation DVD (hereinafter referred to as HD-DVD), or a Blu-ray, using light with a shorter wavelength than red light (i.e., 405-408 nm), such as blue light, and an objective lens with an NA of 0.6 or higher and having a narrow track.

Meanwhile, in order to secure a tolerance due to the tilt of the optical disc, the thickness of the optical disc should be reduced if the NA of the objective lens is increased for high-density recording. Therefore, in consideration of an allowable tolerance due to the tilt of the optical disc, the thickness of a conventional CD, i.e., 1.2 mm is reduced to 0.6 mm for a DVD and an HD-DVD. Also, the NA of an objective lens is increased from 0.45 for a conventional CD to 0.65 for a DVD and an HD-DVD. In case of the HD-DVD, a blue light source will probably be used in consideration of its recording capacity as a light source. Thus, a problem in the development of an optical disc based on the new standards is the compatibility of the new optical disc with the existing optical disc.

Figure 1:
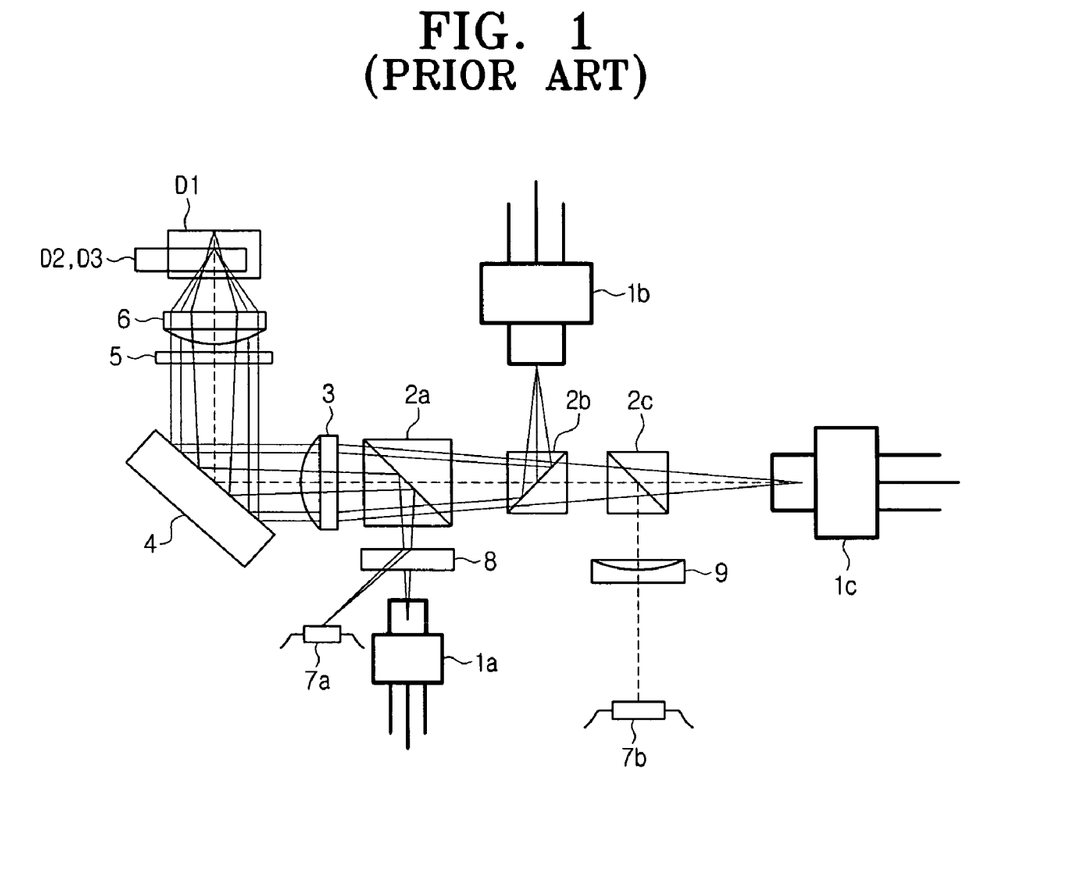
FIG. 1 is a schematic view of a related art optical recording/reproducing apparatus.

FIG. 1 is a schematic view of a related art optical recording/reproducing apparatus compatible with CD, DVD and HD-DVD using a single objective lens.

Referring to FIG. 1, the optical recording/reproducing apparatus includes first to third light sources 1a, 1b, 1c for use with various types of optical recording media of different recording densities and disk thicknesses, respectively; first to third optical path converters 2a, 2b, 2c for converting the path of a light emitted from each of the light sources 1a, 1b, 1c; a collimating lens 3 for collimating lights that passed through the optical path converters 2a, 2b, 2c; a reflective mirror 4 for reflecting lights that passed through the collimating lens 3 to the optical recording medium; a $\lambda/4$ wavelength plate 5 for changing polarization components of an incident light; an objective lens 6 for focusing lights that passed through the $\lambda/4$ wavelength plate 5 onto the optical recording media; and first and second photodetectors 7a, 7b for detecting information from a reflected light from the optical recording media. Here, the first light source 1a is for a CD (D1), the second light source 1b is for a DVD (D2), and the third light source 1c is for an HD-DVD (D3). Reference numeral 8 in FIG. 1 denotes a hologram element for diffracting and refracting light, and reference numeral 9 in FIG. 1 denotes a sensor lens for magnifying a spot of a light received to the first photodetector 7b.

In the above-described optical recording/reproducing apparatus, the second and third light sources 1b, 1c emit lights for recording or reproducing information onto or from the DVD (D2) and the HD-DVD (D3) that require the same thickness and the same numerical aperture (NA). However, the first light source 1a must emit a light for recording or reproducing information onto or from the CD (D1) which has a different thickness and numerical aperture than the DVD (D2) and the HD-DVD (D3). Therefore, a different lens configuration having a different NA from the NA of the objective lens 6 is required, as shown in FIG. 1. As can be seen in the drawing, the first light source 1a is arranged closer to the collimating lens 3 than the second and third light sources 1b, 1c, so a light from the first light source 1a enters the objective lens 6 at a certain incidence angle.

Drawbacks of the optical system illustrated in FIG. 1 are that aberration of the objective lens 6 increases and the aberration increases even more due to the motion of the objective lens 6 under servo control. The increase in aberration produces an error on an information signal and thus an error signal.

Moreover, since the distances between the second and third light sources 1b, 1c and the optical recording media D1, D2, D3 are different from the distance between the first light source 1a and the optical recording media D1, D2, D3, two separate photodetectors 7a, 7b are required. Therefore, a total number of components increases, resulting in increased material cost.

SUMMARY OF THE INVENTION

It is, therefore, an aspect of the present invention to provide a compatible optical recording/reproducing apparatus, capable of detecting an information signal more stably and reducing a total number of components and material cost.

According to another aspect of the present invention, there is provided an optical recording/reproducing apparatus, including: a plurality of light sources emitting lights with different wavelengths for use in recording/reproducing information onto/from various types of optical recording media of different recording densities, in which at least two lights emitted from the light sources have polarization components orthogonal to each other; an objective lens for focusing a light from each of the light sources to a corresponding optical recording medium; a collimating lens disposed between the light sources and the objective lens for collimating lights from the light sources; a hologram element installed between the collimating lens and the objective lens for refracting a light emitted from one of the light sources, in which the light to be refracted is selected by wavelength and polarization components; and a photodetector receiving a light that is reflected from the corresponding optical recording medium after being focused by the objective lens.

According to another aspect of the present invention, distances between each of the light sources and the collimating lens are substantially the same, and the hologram element diffracts and refracts an incident light. Moreover, the plurality of light sources preferably consist of: a first light source for emitting a p-polarized light with a first wavelength; a second light source for emitting an s-polarized light with a second wavelength shorter than the first wavelength; and a third light source for emitting an s-polarized light with a third wavelength shorter than the second wavelength. The hologram element diffracts the p-polarized light with the first wavelength. Also, between the objective lens and the hologram element, a λ/4 wavelength plate having no effects on the p-polarized light is formed, and a diffraction grating is formed on a surface of the hologram element facing the λ/4 wavelength plate.

According to another aspect of the present invention, the optical recording/reproducing apparatus further includes: a first and a second optical path converter for changing the optical path of a light emitted from each of the first and second light sources; a third optical path converter for guiding a reflected light from the corresponding optical recording medium to the photodetector; a reflective mirror disposed between the hologram element and the collimating lens; and a lens housing accommodating the objective lens, the λ/4 wavelength plate, and the hologram element. Here, servo control on the objective lens is achieved by controlling the movement of the lens housing.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
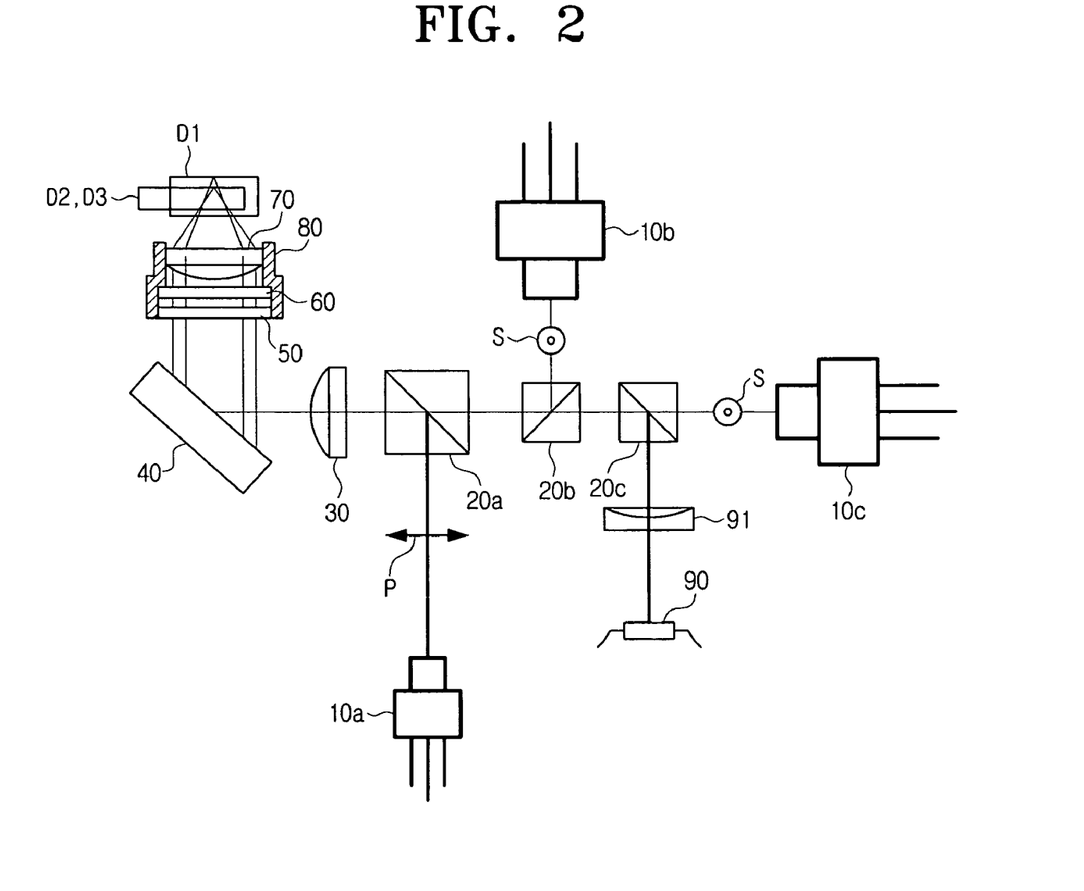
FIG. 2 is a schematic view of an optical recording/reproducing apparatus according to an embodiment of the present invention.

Referring to FIG. 2, an optical recording/reproducing apparatus according to an aspect of the present invention includes, a plurality of light sources 10a, 10b, 10c, a plurality of optical path converters 20a, 20b, 20c, a collimating lens 30, a reflective mirror 40, a hologram element 50, a λ/4 wavelength plate 60, an objective lens 70, a lens housing 80, and a photodetector 90.

The plurality of light sources 10a, 10b, 10c comprise a first CD-light source 10a for recording/reproducing information onto/from a CD D1, a second DVD-light source 10b for recording/reproducing information onto/from a DVD D2, a third HD-DVD light source 10c for recording/reproducing information onto/from an HD-DVD D3.

The first light source 10a is formed of a laser diode for example, and emits a p-polarized light of approximately 785 nm. The second light source 10b emits an s-polarized light of approximately 655 nm. Lastly, the third light source 10c emits an s-polarized light of approximately 405 nm. The distances from each of the first to third light sources 10a, 10b, 10c to the collimating lens 30 are substantially the same.

The optical path converters 20a, 20b, 20c comprise a first optical path converter 20a for reflecting a light emitted from the first light source 10a to the collimating lens 30, a second optical path converter 20b for reflecting a light emitted from the second light source 10b to the collimating lens 30, and a third optical path converter 20c for reflecting lights emitted from the corresponding optical recording media D1, D2, D3 to the photodetector 90.

The collimating lens 30 collimates a light emitted from each light source 10a, 10b, 10c.

The reflective mirror 40 reflects a light that passed through the collimating lens 30 to the objective lens 70, and reflects a light that was reflected from the optical recoding media D1, D2, D3 to the collimating lens 30.

Figure 3:
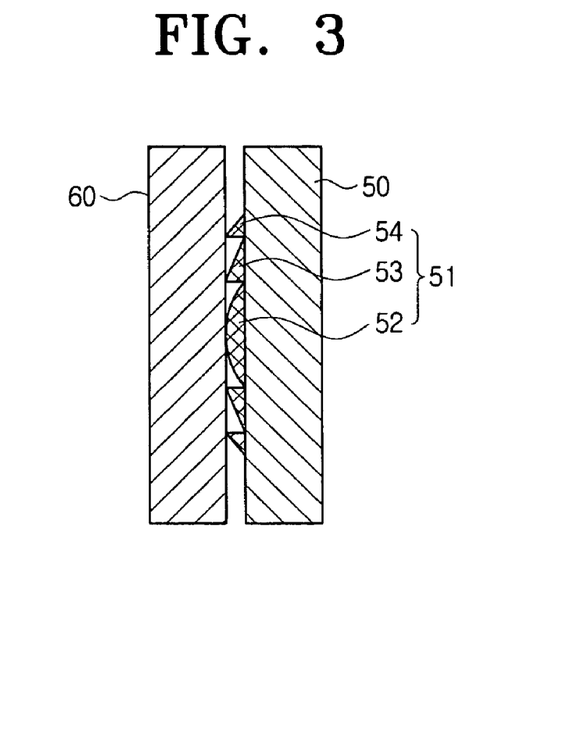
FIG. 3 is a cross-sectional view showing a λ/4 wavelength plate and a hologram element in FIG. 2.
Figure 4:
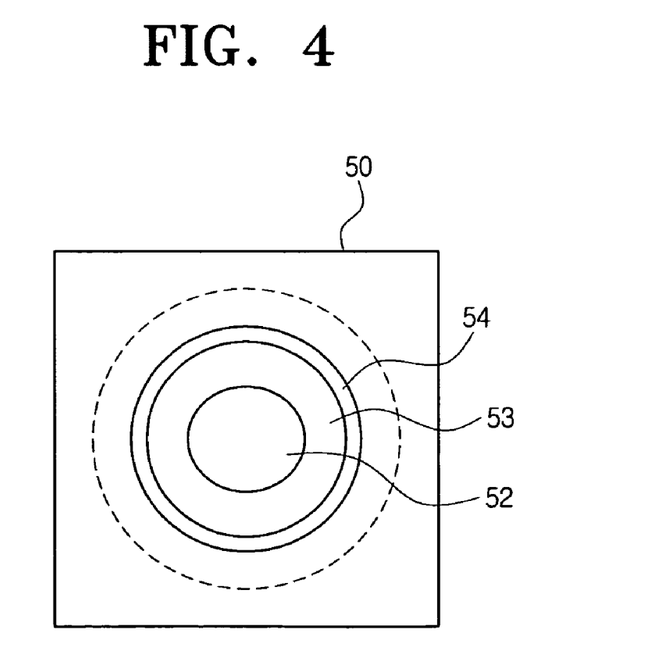
FIG. 4 is a front view of the hologram element in FIG. 2.

The hologram element 50, as shown in FIGS. 3 and 4, is an element for diffracting and refracting a light emitted form the first light source 10a, and is disposed between the λ/4 wavelength plate 60 and the reflective mirror 40. On the surface of the hologram element 50 facing the λ/4 wavelength plate 60, a diffraction grating 51 for diffracting a light emitted from the first light source 10a is formed. The diffraction grating 51 includes a dome-shaped protrusion 52 formed at the central portion of the hologram element 50, and two ring-shaped protrusions 53, 54 formed in a ring shape with respect to the dome-shaped protrusion 52. Preferably, the cross section of each of the ring-shaped protrusions 53, 54 has a sawtooth shape, in order to increase the efficiency of light diffraction and refraction.

The hologram element 50 having the above configuration is dependent on wavelength and polarization components of light. In other words, the diffraction efficiency is high only if a light is of a wavelength of a selected region or a light has selected polarization components, and the diffraction efficiency is very low otherwise, that is, if a light is not of a wavelength of a selected region or a light does not have selected polarization components. Therefore, the hologram element 50 operates only on the light with a wavelength of a selected region and with selected polarization components. In this embodiment of the invention, the hologram element 50 works only on a p-polarized light of a first wavelength. For instance, the hologram element 50 diffracts and refracts a p-polarized light of approximately 785 nm emitted from the first CD light source 10a. Hence, an s-polarized light of a second and a third wavelength emitted from the second and the third light sources 10b, 10c, respectively, are not diffracted by the hologram element 50. Moreover, p-polarized lights of the second and third wavelengths, which have reflected from the optical recording mediums D2, D3 and passed through the λ/4 wavelength plate 60, are not diffracted by the hologram element 50, either.

Although the exemplary embodiment of the invention introduced the diffraction grating 51 formed of a dome-shaped protrusion 52 and two ring-shaped protrusions 53, 54, its configuration may change in diverse pattern, depending on the design of the optical system. By making a light from the first light source 10a refracted at a predetermined angle by the hologram element 50 before it enters the objective lens 70, the light is changed adaptive to the thickness and numerical aperture required of a CD. Therefore, by setting the first to third light sources 10a, 10b, 10c to be the same distance from the collimating lens 30, the light is changed adaptive to the thickness and numerical aperture required of a CD.

The λ/4 wavelength plate 60 is disposed between the objective lens 70 and the hologram element 50, and operates selectively according to wavelengths. For instance, in this embodiment of the invention, the λ/4 wavelength plate 60 does not operate on a light of the first wavelength, but operates on lights of the second and the third wavelengths. That is to say, a light emitted from the first light source 10a does not get changed to a circularly polarized light by the λ/4 wavelength plate 60, but is scanned onto a recording medium in a form of p-polarized light. On the other hand, s-polarized lights emitted from the second and third light sources 10b, 10c are changed into right-circularly polarized lights as they come in the λ/4 wavelength plate 60, and the right-circularly polarized lights are reflected from the optical recording mediums D2, D3 and changed into left-circularly polarized lights. These left-circularly polarized lights are changed into p-polarized lights as they pass through the λ/4 wavelength plate 60.

The lens housing 80 is a frame in which the object lens 70, the λ/4 wavelength plate 60, and the hologram element 50 are supported. The movement of the lens housing 80 is controlled under servo control of the objective lens 70. In other words, the object lens 70, the λ/4 wavelength plate 60, and the hologram element 50 act as one unit through the lens housing 80.

The photodetector 90 receives lights reflected from the optical recording media D1, D2, D3 and detects an information signal and an error signal. A good example of the photodetector 90 is a PDIC (Photo Diode Integrated Circuit). The error signal is used for focusing control, tilting control and tracking control of the objective lens 70. Instead of placing the first to third light sources 10a, 10b, 10c the same optical distance from the collimating lens 30, the optical distances from the light sources 10a, 10b, 10c to the corresponding optical recording media D1, D2, D3 are equal. Therefore, a single photodetector 90 can detect all the lights emitted from each of the light sources 10a, 10b, and 10c.

Reference numeral 91 denotes a sensor lens. The sensor lens 91 magnifies a spot of a light received by the photodetector 90, or causes astigmatism to a light reflected from the third optical path converter 20c in case of performing a focusing control based on the differential astigmatism.

With reference to FIGS. 2 to 4, the following explains the operation of the optical recording/reproducing apparatus, according to one embodiment of the present invention.

One of the first to third light sources 10a, 10b, 10c emits a light of a predetermined wavelength, and at least two of them emit two linearly polarized lights orthogonal to each other. Then optical path conversion is executed. Namely, a p-polarized light from the first light source is incident on the collimating lens 30 through the first optical path converter 20a, whereas an s-polarized light from the second light source 10b is incident on the collimating lens 30 through the second optical path converter 20b. Meanwhile, light emitted from the third light source 10c goes through the first to third optical path converters 20a, 20b, 20c and is incident on the collimating lens 30. The incident light is changed to parallel light by the collimating lens 30, and guided to the hologram element 50 by the reflective mirror 40.

The incident light on the hologram element 50 is selectively diffracted by wavelengths and polarization components thereof. For instance, a p-polarized light of the first wavelength emitted from the first light source 10a is diffracted and diverged by the hologram element 50. At this time, among the light emitted from the first light source 10a, only a light received at a region within a dotted line in FIG. 4 becomes an effective light to form a spot on the optical recording medium D1, and is detected by the photodetector 90. However, among the light emitted from the first light source 10a, a light outside of the region within a dotted line in FIG. 4 does not form a spot on the optical recording medium D1 and on the photodetector 90, so it cannot be used as an effective light for detecting an information signal and an error signal. Meanwhile, s-polarized light of the second and third wavelengths emitted from the second and third light sources 10b, 10c, respectively is not diffracted by the hologram element 50 but is fully transmitted.

When a light from the first light source 10a being diffracted and refracted by the hologram element 50 enters the λ/4 wavelength plate 60, the light is fully transmitted therethrough without having any change in its polarization components and travels to the objective lens 70. This light of the first wavelength is incident on the objective lens 70 as a non-parallel light and is scanned onto the optical recording medium D1 according to a numerical aperture required of the CD D1. However, the s-polarized lights, which were emitted from the second and third light sources 10b, 10c and transmitted through the hologram element 50, are changed into right-circularly polarized lights by the λ/4 wavelength plate 60, reflected from the optical recording media D1, D2, D3, and changed into left-circularly polarized lights. These left-circularly polarized lights are changed into p-polarized lights as they pass through the λ/4 wavelength plate 60 again.

A light from the first light source 10a, which is reflected from the optical recording medium D1 and transmitted through the λ/4 wavelength plate 60, is emitted in a state where the light is not yet diffracted by the hologram element 50. However, lights from the second and third light sources 10b, 10c, which were reflected from the optical recording medium D1, are fully transmitted without being affected by the hologram element 50.

A light having passed through the hologram element 50 is incident on the first optical path converter 20a via the reflective mirror 40 and the collimating lens 30. A part of the incident light on the first optical path converter 20a is reflected and the other part of the incident light enters the second optical path converter 20b. Again, a part of the incident light on the second optical path converter 20b is reflected and the other part of the incident light enters the third optical path converter 20c. A part of the incident light on the third optical path converter 20c is reflected to the photodetector 90, and another part of the incident light passes through the third optical path converter 20c, thereby becoming a non-effective light. The photodetector 90 detects an intensity of the incident light thereon and calculates an information signal and an error signal from the detected signal. To perform servo control on the objective lens 70 by the error signal, the movement of the lens housing 80 is controlled.

As explained so far, the optical recording/reproducing apparatus according to an aspect of the present invention, where the light sources are the same distance from the collimating lens, can be advantageously used for reducing aberration of the objective lens that is frequently observed in the existing limited optical system. In consequence, an information signal and an error signal are detected more stably.

Moreover, since the distances from the objective lens to each of the light sources are the same, one single photodetector is sufficient to receive all the lights reflected from the optical recording mediums. Thus, a total number of components used in the apparatus can be reduced, and therefore the material cost of the apparatus can also be reduced.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An optical recording/reproducing apparatus, comprising:
   a plurality of light sources emitting lights with different wavelengths for use in recording/reproducing information onto/from various types of optical recording media of different recording densities, in which at least two lights emitted from the plurality of light sources have polarization components orthogonal to each other;
   an objective lens focusing the lights from each of the plurality of light sources to the corresponding one of the optical recording media;
   a collimating lens disposed between the plurality of light sources and the objective lens collimating the lights from the plurality of light sources;
   a hologram element installed between the collimating lens and the objective lens, refracting a light emitted from one of the plurality of light sources, in which the light to be refracted is selected by wavelength and polarization components;
   a photodetector receiving the light that is reflected from the corresponding optical recording media after being focused by the objective; and
   a λ/4 wavelength plate between the objective lens and the hologram element, and
   wherein the plurality of light sources comprise:
      a first light source emitting a p-polarized light with a first wavelength;
      a second light source emitting an s-polarized light with a second wavelength shorter than the first wavelength; and
      a third light source emitting an s-polarized light with a third wavelength shorter than the second wavelength, and
   wherein the hologram element diffracts the p-polarized light with the first wavelength, and
   wherein the s-polarized lights emitted from the second and third light sources and transmitted through the hologram element are changed into right-circularly polarized lights by the λ/4 wavelength plate, reflected from the optical recording media and changed into left-circularly polarized plates.

2. The apparatus according to claim 1, wherein distances between each of the plurality of light sources and the collimating lens are substantially the same.

3. The apparatus according to claim 1, wherein the hologram element diffracts and refracts an incident light.

4. The apparatus according to claim 1, wherein the λ/4 wavelength plate has no effect on the p-polarized light.

5. The apparatus according to claim 4, further comprising a diffraction grating formed on a surface of the hologram element, facing the λ/4 wavelength plate.

6. The apparatus according to claim 5 further comprising:
   first and second optical path converters changing the optical path of the light emitted from each of the first and second light sources, respectively; and
   a third optical path converter for guiding the reflected light from the corresponding optical recording media to the photodetector.

7. The apparatus according to claim 6 further comprising:
   a reflective mirror disposed between the hologram element and the collimating lens.

8. The apparatus according to claim 7 further comprising:
   a lens housing accommodating the objective lens, the λ/4 wavelength plate, and the hologram element,
   wherein servo control on the objective lens is realized by controlling a movement of the lens housing.

9. The apparatus according to claim 5, wherein the diffraction grating includes a dome-shaped protrusion formed at a central portion of the hologram element, and two ring-shaped protrusions, concentric to the dome-shaped protrusion.

10. The apparatus according to claim 9, wherein a cross section of each of the ring-shaped protrusions has a sawtooth shape.

11. An optical recording/reproducing apparatus, comprising:
   a plurality of light sources emitting lights with different wavelengths for use in recording/reproducing information onto/from various types of optical recording media of different recording densities;
   an objective lens focusing the light from each of the plurality of light sources to a corresponding optical recording medium;
   a collimating lens disposed between the plurality of light sources and the objective lens, collimating the lights from the plurality of light sources;
   a hologram element installed between the collimating lens and the objective lens, refracting the light emitted from one of the plurality of light sources, in which the light to be refracted is selected by wavelength and polarization components;
   a photodetector receiving the light that is reflected from the corresponding optical recording media after being focused by the objective; and
   a λ/4 wavelength plate between the objective lens and the hologram element,
   wherein optical distances between the plurality of light sources to the collimating lens are the same, and
   wherein the plurality of light sources comprise:
      a first light source emitting a p-polarized light with a first wavelength;
      a second light source emitting an s-polarized light with a second wavelength shorter than the first wavelength; and
      a third light source emitting an s-polarized light with a third wavelength shorter than the second wavelength, and
   wherein the hologram element diffracts the p-polarized light with the first wavelength, and wherein the s-polarized lights emitted from the second and third light sources and transmitted through the hologram element are changed into right-circularly polarized lights by the λ/4 wavelength plate, reflected from the optical recording media and changed into left-circularly polarized plates.

12. The apparatus according to claim 11, further comprising a diffraction grating formed on a surface of the hologram element.

13. The apparatus according to claim 12, wherein the diffraction grating includes a dome-shaped protrusion formed at a central portion of the hologram element, and two ring-shaped protrusions, concentric to the dome-shaped protrusion.

14. The apparatus according to claim 13, wherein a cross section of each of the ring-shaped protrusions has a sawtooth shape.

15. The apparatus according to claim 11, wherein the λ/4 wavelength plate has no effect on the p-polarized light.

16. The apparatus according to claim 11, wherein when a light from the first light source diffracted and refracted by the hologram element enters the λ/4 wavelength plate, the light is fully transmitted therethrough without any change in the light's polarization components and travels to the objective lens.

17. The apparatus of claim 11, wherein the left-circularly polarized lights are changed into p-polarized lights as the lights pass through the λ/4 wavelength plate once again.

18. An optical recording/reproducing apparatus, comprising:
a plurality of light sources emitting lights with different wavelengths for use in recording/reproducing information onto/from various types of optical recording media of different recording densities;
an objective lens focusing the light from each of the plurality of light sources to a corresponding optical recording medium;
a collimating lens disposed between the plurality of light sources and the objective lens, collimating the lights from the plurality of light sources;
a hologram element installed between the collimating lens and the objective lens for refracting the light emitted from one of the plurality of light; and
a λ/4 wavelength plate between the objective lens and the hologram element,
wherein the refracted light is selected according to the wavelength and polarization components, and
wherein the plurality of light sources comprise:
a first light source emitting a p-polarized light with a first wavelength;
a second light source emitting an s-polarized light with a second wavelength shorter than the first wavelength; and
a third light source emitting an s-polarized light with a third wavelength shorter than the second wavelength, and
wherein the hologram element diffracts the p-polarized light with the first wavelength, and
wherein the s-polarized lights emitted from the second and third light sources and transmitted through the hologram element are changed into right-circularly polarized lights by the λ/4 wavelength plate, reflected from the optical recording media and changed into left-circularly polarized plates.

* * * * *

UNITED STATES PATENT AND TRADEMARK OFFICE
CERTIFICATE OF CORRECTION

| | | |
|---|---|---|
| PATENT NO. | : 7,606,135 B2 | Page 1 of 1 |
| APPLICATION NO. | : 11/430847 | |
| DATED | : October 20, 2009 | |
| INVENTOR(S) | : Jang-hoon Yoo et al. | |

It is certified that error appears in the above-identified patent and that said Letters Patent is hereby corrected as shown below:

Column 7, line 48, insert --lens-- after "objective".

Column 8, line 52, insert --lens-- after "objective".

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO.       : 7,606,135 B2                                Page 1 of 1
APPLICATION NO.  : 11/430847
DATED            : October 20, 2009
INVENTOR(S)      : Yoo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 739 days.

Signed and Sealed this

Fifth Day of October, 2010

David J. Kappos
*Director of the United States Patent and Trademark Office*